US007439933B2

(12) United States Patent
Uesaka

(10) Patent No.: US 7,439,933 B2
(45) Date of Patent: Oct. 21, 2008

(54) SIGNAL PROCESSING CIRCUIT, AND NON-CONTACT IC CARD AND TAG WITH THE USE THEREOF

(75) Inventor: Kouichi Uesaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 11/412,988

(22) Filed: Apr. 28, 2006

(65) Prior Publication Data

US 2006/0244676 A1 Nov. 2, 2006

(30) Foreign Application Priority Data

Apr. 28, 2005 (JP) ............................ 2005-130733

(51) Int. Cl.
*H01Q 1/36* (2006.01)
*G06K 19/07* (2006.01)

(52) U.S. Cl. ..................... 343/895; 340/572.7; 235/492

(58) Field of Classification Search ................. 343/895, 343/742, 867; 340/572.7; 235/492
See application file for complete search history.

(56) References Cited

U.S. PATENT DOCUMENTS

| | | | | |
|---|---|---|---|---|
| 6,295,029 | B1 | 9/2001 | Chen | |
| 7,212,124 | B2 * | 5/2007 | Ohkawa et al. | 340/572.7 |
| 2002/0005809 | A1 | 1/2002 | Manteuffel | |
| 2003/0117325 | A1 | 6/2003 | Jo, et al. | |
| 2005/0011961 | A1 | 1/2005 | Uesaka | |

FOREIGN PATENT DOCUMENTS

| | | |
|---|---|---|
| EP | 0 886 232 | 12/1998 |
| JP | 05-290229 | 11/1993 |
| JP | 2004-240899 | 8/2004 |
| JP | 2004-297499 | 10/2004 |

* cited by examiner

*Primary Examiner*—Michael C Wimer
(74) *Attorney, Agent, or Firm*—Antonelli, Terry, Stout & Kraus, LLP.

(57) ABSTRACT

To provide an RFID (a signal processing circuit) equipped with a single rectangular spiral antenna and being capable of transmitting and receiving an electric power and signal by a plurality of frequency bands therewith, the present invention limits a longitudinal dimension (long sides) of the rectangular spiral antenna designed for transmission and reception of carrier of the HF band thereby to the length suitable for transmission and reception of carrier of the UHF band thereby as well as a widthwise dimension thereof so as to prevent a current waveform due to the carrier of the UHF band from reversing in phase at one of the long sides thereof.

14 Claims, 4 Drawing Sheets

(a)

(b)

(c)

SIGNAL PROCESSING CIRCUIT, AND NON-CONTACT IC CARD AND TAG WITH THE USE THEREOF

The present application claims priority from Japanese application JP2005-130733 filed on Apr. 28, 2005, the content of which is hereby incorporated by reference into this application.

BACKGROUND OF THE INVENTION

1. Field of the Invention

The present invention relates to a signal processing circuit provided on a non-contact IC card or tag such as a cash card, credit card, commutation ticket, coupon ticket, management card, ID card, driver's license, commodity management tag, and logistic management card used in a cash dispenser, electronic money system, automatic ticket gate, entry/exit management system, commodity management system, and logistic management system, and to a signal processing circuit equipped with an antenna used for transmission of an operating power and communication between the non-contact IC card or tag and a reader/writer.

2. Description of the Related Art

The non-contact IC card or tag mainly uses electromagnetic waves of High Frequency (HF) to Ultra High Frequency (UHF) bands to perform power transmission and communication. In general the HF band is known as a frequency band of 3 MHz to 30 MHz, among other things, the use of carrier of 13.56 MHz is prevailing for communication and power transmission between a non-contact IC card or tag (hereinafter, collectively referred to as "Radio Frequency Identification" RFID) and a reader/writer. The UHF band is generally known as a frequency band of 300 MHz to 3000 MHz. A carrier of 2.45 GHz is available in Japan and a frequency band of 860 MHz to 960 MHz is available in the United States and Europe for communication and power transmission between the RFID and reader/writer. A frequency of 5.8 GHz higher than the above band is allowed to be used in one-way communication from the RFID to a reader in a toll load.

Transmission and reception of electric power and information by the carrier of the HF band between the RFID and reader/writer is mainly performed in such a manner that a spiral antenna provided on the RFID is interlinked with magnetic field outputted from the antenna of the reader/writer to cause the spiral antenna to induce an electric power and signal current. On the other hand, the supply of electric power to RFID and the transmission and reception of information by the carrier of the UHF band are mainly performed in such a manner that a dipole antenna or a patch antenna provided on the RFID receives electric field from a reader/writer and the like to induce an electric power and signal current.

For the foregoing frequency used in communication between the above RFID and the reader/writer or an equivalent (for example, only a reader), there are regulations with regard to the output of transmission of electromagnetic waves stipulated by the administration. For this reason, it is prohibited to radiate electromagnetic waves exceeding the regulated value from for example the RFID without permission from an organization in charge of this matter. Thus, in a communicating between the RFID and an identifying device such as a reader/writer (also called external device, transmission/reception terminal station unit, base station for the RFID according to applications, hereinafter referred to as "external device") by using the carrier of the HF band, a distance between which is obliged to be short because of a small output of the HF band. On the other hand, in communicating between the RFID and the external device by using the carrier of the UHF band, a distance between which can be extended because the output of the UHF band can be increased.

Under these circumstances, the following patent document 1 has proposed a hybrid-type IC card on which a near magnetic field-type module using the carrier of the HF band and a radio-type module using the carrier of the UHF band are mounted. A non-contact IC card similar to the above has been disclosed in the following patent document 2 and a communication terminal device similar to the above is also disclosed in the following patent document 3.

[Patent Document 1] JP-A No. 240899/2004.

[Patent Document 2] JP-A No. 290229/1993.

[Patent Document 3] JP-A No. 297499/2004.

SUMMARY OF THE INVENTION

As stated in the above patent documents, the non-contact IC card or tag for a system using both the HF and UHF bands has hitherto adapted to mount antennas responding to the respective frequencies and corresponding to the number of the carrier frequencies. This widens a mounting area of the non-contact IC card and tag, and an IC to be mounted thereon increases in chip size because of the need for terminals for each of the antennas.

The above patent document 3 has implied that when the communication terminal unit disclosed therein receives a signal by one carrier (UHF band), the antenna for receiving the other carrier (UHF band) is interfered, which requires dummy antenna for avoiding the interference.

In relation to the above problems, an antenna usable in a plurality of bands enables reducing a mounting area and a chip size. It is also expected that interference occurred between the antennas can be suppressed. With these technical background in view, the present invention has for its purpose to provide a single antenna capable of responding to a plurality of usable bands.

A spiral antenna being used in the HF band and inducing voltage by magnetic field is greatly different from a dipole antenna being used in the UHF band and inducing voltage by electric field in that in the former one end of a conductor (wiring) composing the antenna is structurally short-circuited to the other end thereof, but in the latter it is structurally open-circuited. An antenna for effectively transmitting and receiving a signal and electric power in both the HF and UHF bands needs selecting either of the above structures. Inventor's attention has been drawn by "folded dipole antenna" which induces an electric field in the UHF band and one and the other end of which are short-circuited. An antenna of this type is so structured that both open ends of the dipole are folded and short-circuited with another path. For this reason, a current being reverse in phase to the original dipole part (portion not to be folded) is distributed on a line composing a folded dipole-type antenna, but the directions of currents to be produced on the lines to be folded and not to be folded are opposite, so that the electric field to be radiated will be in phase.

The inventor has attempted to extend the distance of the dipole structure between a part extending from the end thereof (part to which elements such as ICs are electrically connected) to the primary direction (i.e., a part not to be folded) and a part extending opposite to the primary direction (i.e., part to be folded) to shape the folded dipole structure into a loop. At this point, current waveforms (alternating current waveforms according to the frequency of a carrier) are reversed in phase on the way at other parts of the dipole structure of which distance is extended between parts to be folded and not to be folded, for example, at short-side lines in a rectangular folded dipole structure, where the parts to be folded and not to be folded are taken as long sides, so that an electric field is not radiated. On the other hand, current distribution is high at the original element (part not to be folded) and the part to be folded which correspond to the long side of the rectangular spiral antenna, which functions as an antenna for radiating electric field in phase. If the line length of loop of the rectangular dipole structure is sufficiently shorter than the wavelength of carrier frequency of the HF band, interlinking the loop of the antenna with the magnetic field oscillating at frequencies of the HF band provides the antenna with voltage induced in proportion to the magnetic voltage.

The above folded dipole-type antenna is formed as a loop antenna whose line length is sufficiently shorter than the carrier wavelength of the HF band and functions as a folded dipole antenna which is slightly lower in transmission and reception efficiency for the carrier of the UHF band, which enables a single antenna to realize effective transmission and reception in two frequency bands.

On the other hand, it is desirable to shape the folded dipole structure into a spiral shape because the antenna for transmitting and receiving the carrier of the HF band requires some inductive components. Then, a plurality of conductor lines (antenna elements) with the folded dipole structure are connected in series to produce a spiral antenna composed of multi-stage antenna elements. In the spiral antenna formed by arranging a plurality of antenna elements without intersecting with each other, the antenna element positioned at the outer periphery is different in length per turn from that at the inner periphery. For this reason, even if positive current waveforms are distributed at one of the long side and negative current waveforms are distributed at the other thereof in one turn of the antenna element at the inner periphery, for example, a phase is inverted on the way of the line on the long side in one turn of the antenna element at the outer periphery which is different in line length from the antenna element at the inner periphery, which will significantly lower a transmission and reception efficiency. In order to minimize the difference in length for each turn, pitch (arrangement space) between an adjacent pair of the antenna elements (composed of conductor lines) is narrowed, thereby suppressing such deviation of current distribution and suppressing reduction in the transmission and reception efficiency.

Based on the above consideration, the present invention provides a signal processing circuit being included in a non-contact IC card or tag (RFID) and capable of acting to transmit an electric power and communicate between the RFID and the external device such as a reader/writer, the signal processing circuit on which a rectangular spiral antenna is provided, thereby performing communication by using at least two carrier frequencies. The signal processing circuit is provided with ICs including an RF circuit or circuit element responding to each of the two carrier frequencies and supplied by power from the external device through the above rectangular spiral antenna, or performs transmission and reception of information with the external device.

It is desirable to determine the difference in length between the conductor lines to ensure the functions of the dipole antenna because the rectangular spiral antenna is structured by sequentially arranging (for example, coaxially) a plurality of the conductor lines with the folded dipole structure from the outer toward the inner periphery thereof. For this reason, it is desirable to satisfy the relationship of $2\times(L_{xi}+L_{yi})<\lambda 2<2\times(L_{xo}+L_{yo})$, where the two carrier frequencies are taken as $f_1$ and $f_2$ (where, $f_1<f_2$), wavelengths corresponding to the carrier frequencies $f_1$ and $f_2$ are taken as $\lambda_1$ and $\lambda_2$ (where $\lambda_1>\lambda_2$) respectively, the length of the long side of the conductor line at the outermost periphery of the rectangular spiral antenna (also called the outer dimension in the long side) is taken as $L_{xo}$, and the length of the short side thereof (also called the outer dimension in the short side) is taken as $L_{yo}$, the length of the long side of the conductor line at the innermost periphery (also called the inner dimension in the long side) is taken as $L_{xi}$, and the length of the short side thereof (the inner dimension in the short side) is taken as $L_{yi}$. It is also desirable that the line length of the rectangular spiral antenna satisfies the relationship of $L<<\lambda_1$ in terms of using the rectangular spiral antenna as a loop antenna, of transmitting an electric power to the signal processing circuit by the carrier with a wavelength of $\lambda_1$ and of transmitting and receiving information.

When the rectangular spiral antenna has opposing first and second long sides and opposing first and second short sides, the conductor lines sequentially extend from one end positioned at the first long side to the other end positioned at the first long side via the first long side, the second short side, the second long side and the second short side. In each of adjacent pairs of the plurality of the conductor lines, the other end of one of the conductor lines is connected to one end of the other of the conductor line at the first long side to draw a spiral line. The total length (for example, sum of lengths of N conductor lines composing the rectangular spiral antenna) will be a line length L of the rectangular spiral antenna. When a pair of the adjacent conductor lines is spaced away by $P_{L1}$ at the first long side, $P_{S1}$ at the first short side, $P_{L2}$ at the second long side and $P_{S2}$ at the second short side, a difference of $2\times(P_{L1}+P_{S1}+P_{L2}+P_{S2})$ is made between both the line lengths. It is desirable that the sum of the differences in line length for each of adjacent pairs ((N − 1) pairs at N conductor lines) of the plurality of the conductor lines composing the rectangular spiral antenna is smaller than $\lambda_2/2$. When each of pairs of the conductor lines is equally spaced by a pitch "p" at the above four sides, the sum is expressed by $(N-1)\times 8p<\lambda_2/2$.

Further advantages of the signal processing circuit, and non-contact IC card and tag with the use thereof according to an aspect of the present invention are described in detail in Best Mode for Carrying Out the Invention.

According to the aspect of the present invention, a single antenna adapted to at least two usable frequency bands, relative to conventional RFID systems, makes a non-contact IC card and tag adaptable to a variety of systems, small and inexpensive.

DETAILED DESCRIPTION

Figure 1:
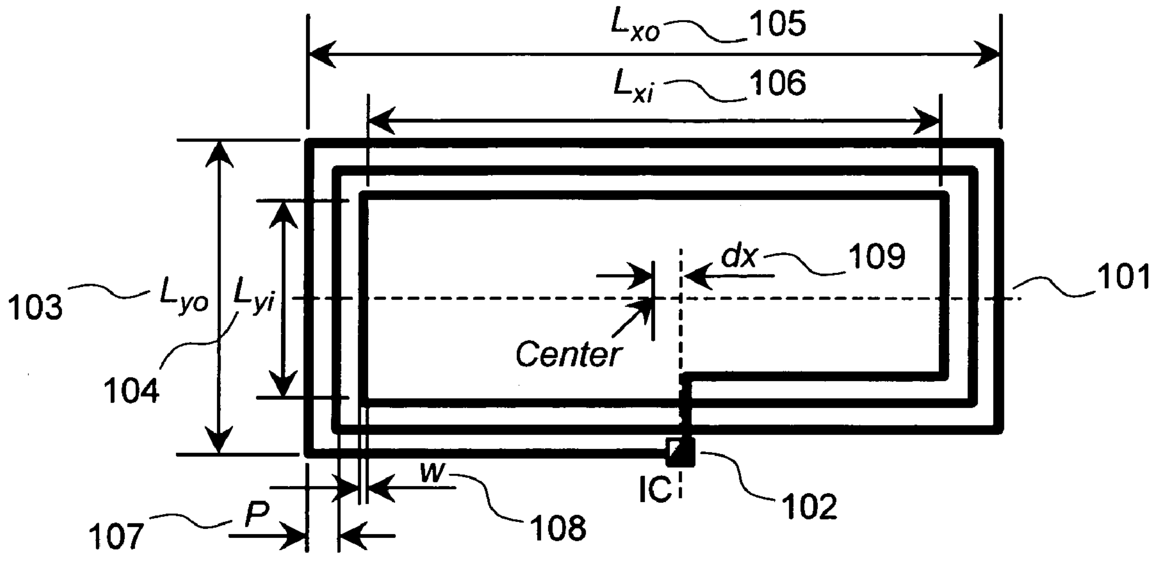
FIG. 1 is a circuit diagram showing a signal processing circuit provided with a dual band antenna according to an embodiment of the present invention.

FIG. 1 shows an antenna 101 according to the present invention characterized by being available in two frequency bands.

The antenna is spiral and has a gain effective in two carrier frequency bands. When the two carrier frequencies are taken as $f_1$ and $f_2$ ($f_1 < f_2$), the relation of wavelengths $\lambda_1$ and $\lambda_2$ ($\lambda_1 > \lambda_2$) corresponding to the carrier frequencies to the line length L and the number of windings N of the antenna (N is an integer of two or more) is expressed by the following formulas:

$$L << \lambda_1 \quad (1)$$

$$L \approx N\lambda_2 \quad (2)$$

Figure 2:
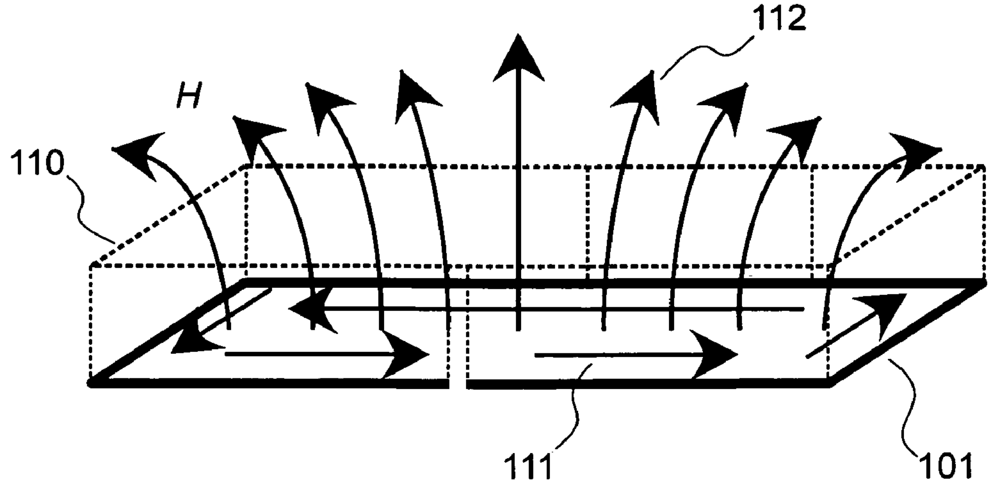
FIG. 2 is a schematic diagram showing current distribution in a low frequency (ex. HF) band on the antenna line shown in FIG. 1.

With regard to the carrier frequency $f_1$, the line length of the antenna is much shorter than the wavelength of the carrier as expressed in the formula (1), so that a current distribution 110 above the antenna line becomes substantially uniform as shown in FIG. 2. At this point, a current 111 flows along a wiring (conductor line) composing the antenna 101, thereby generating magnetic field H (line of magnetic force 112) from an opening formed by the loop of the antenna 101. Thus, mutual inductance generated between a spiral antenna provided on a reader/writer (R/W, not shown) and the antenna 101 performs the transmission of electric power and the transfer of communication signals.

Figure 3:
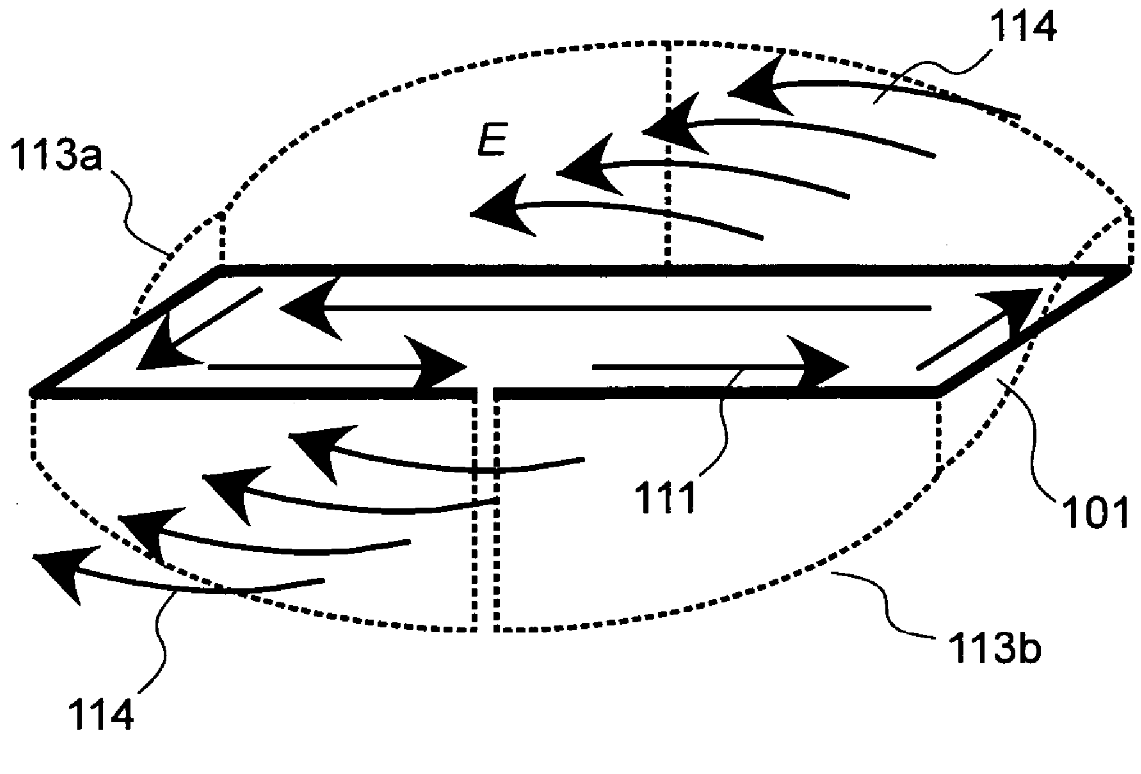
FIG. 3 is a schematic diagram showing current distribution in a high frequency (ex. UHF) band on the antenna line shown in FIG. 1.

In regard of the carrier frequency $f_2$, on the other hand, the length of the spiral antenna 101 per turn is approximately equal to the wavelength as expressed in the formula (2), so that a current distribution 113 above the antenna line reverses in phase on the way as shown in FIG. 3. Providing an integrated circuit (IC) 102 around the center in the longitudinal direction of the antenna causes the above current distribution to indicate a positive phase 113*a* on one side in the longitudinal direction and a negative phase 113*b* on the other side. If a current waveform 113 is compared to a sinusoidal wave, it is shown that waveforms crossing over from the first to the second quadrant and from the third to the fourth quadrant appear on one side and on the other side in the longitudinal direction respectively, and both the waveforms are reverse to each other in phase. At this point, the current distribution 113*a* with a positive phase generates an electric field E (hereinafter, electric line of force 114 is read as electric field) in the tangential direction of the current direction, but the current distribution 113*b* with a negative phase generates an electric field 114 in the tangential direction opposite to the current direction. The direction in which the current 111 generating these electric fields 114 or induced by the electric fields 114 flows along a wiring (conductor line) is opposite from one side to the other in the longitudinal direction, so that the electric fields 114 produced at the respective sides are same in phase with each other and are strengthened with each other. This provides the spiral antenna 101 with a gain effective for a dipole antenna. That is basically produced as is the case with a folded dipole antenna. The realization of the above behavior by the use of an antenna produced in such a manner that a plurality of conductor lines with such a structure (folded dipole structure) are sequentially arranged (for example, coaxially as in FIG. 1) and connected to each other to be formed into a spiral shape needs solving a problem in that the plurality of conductor lines are different in length for each turn. This is an inevitable problem caused when the plurality of conductor lines composing the spiral antenna 101 are arranged without intersecting with each other as shown in FIG. 1. The following cases require considering to solve the problem.

(A) The Case in which the Wiring at the Outermost Periphery is Equivalent in Length to the Wavelength of the Carrier In the rectangular spiral antenna 101 formed by sequentially connecting N (where, N=3) conductor lines with the folded dipole structure as shown in FIG. 1, a length 105 of long side of the wiring (conductor line) at the outermost periphery (the outer dimension in the longitudinal direction of the antenna) is taken as $L_{xo}$, and a length 103 of short side (the outer dimension in the widthwise direction of the antenna) is taken as $L_{yo}$. A distance 107 between a pair of the adjacent conductor lines (pitch between the antenna wirings) is taken as "p" in any of the longitudinal and the widthwise direction. At this point, a length $L_1$ of the conductor line at the outermost periphery of the rectangular spiral antenna 101 is written as "$L_1=2\times(L_{xo}+L_{yo})$" and a length $L_n$ of the conductor line (line length) located at the n-th turn from the outermost periphery is written as "$L_n=2\times(L_{xo}+L_{yo}-8np)$."

When the rectangular spiral antenna 101 functions as a dipole antenna, it receives and transmits a carrier with a wavelength λ at the long side. The condition discussed here is expressed as "$L_1=\lambda$." The long side of the rectangular spiral antenna 101 is shorter than λ/2 even at the conductor line at the outermost periphery where it is the longest.

If the current distribution 113 reverses in phase at the center of a part (shifted by half) extending in the longitudinal direction of the conductor line, the part will not contribute as a dipole antenna to the radiation of a carrier. Shifting more than that lowers a radiation efficiency. For this reason, the current distribution 113 at the conductor line composing the rectangular spiral antenna 101 is reversed in phase at the part extending toward the short side.

For that reason, it is desirable that the number of windings N (the number of conductor lines) of the rectangular spiral antenna 101 and a pitch for each turn (between conductor lines) satisfies the following formula:

$$\sum_{n=1}^{N} 8np < \frac{\lambda}{2} \quad (3)$$

Satisfying the above relationship limits the position and length between the conductor lines at the outermost and the innermost periphery at the part extending in the longitudinal direction of the respective conductor lines within the range in which the current distribution 113 is allowed to be reversed in phase at the respective conductor lines or causes the current distribution 113 to be reversed in phase at the parts extending toward the short sides at the respective conductor lines to ensure that the rectangular spiral antenna 101 serves as a dipole antenna. The relationship in the above formula (3) can be approximately written as "$(N-1)\times 8p<\lambda/2$" in the rectangular spiral antenna shown in FIG. 1. It is desirable that the outer dimension in the longitudinal direction of the antenna $L_{xo}$ is greater than λ/4 and the outer dimension in the widthwise direction of the antenna $L_{yo}$ is smaller than λ/4.

(B) The case in which the wiring at the innermost periphery is equivalent in length to the wavelength of the carrier In the rectangular spiral antenna 101 shown in FIG. 1, when a length 106 of long side of the wiring (conductor line) at the innermost periphery (the inner dimension in the longitudinal direction of the antenna) is taken as $L_{xi}$, and a length 104 of short side (the inner dimension in the widthwise direction of the antenna) is taken as $L_{yi}$, the length $L_2$ of the conductor line at the innermost periphery is written as "$L_2=2\times(L_{xi}+L_{yi})$" and a length $L_n$ of the conductor line (line length) located at the n-th turn from the innermost periphery is written as "$L_n=2\times(L_{xi}+L_{yi}+8\ np)$." The rectangular spiral antenna 101 as a dipole antenna receives and transmits a carrier with a wavelength λ at the long side. Since the condition discussed here is expressed as "$L_2=\lambda$," the conductor line at the innermost periphery at the long side of the rectangular spiral antenna 101 is shorter than λ/2, but the conductor line located at further inward periphery might be longer than λ/2.

For this reason, it is desirable that the number of windings N of the rectangular spiral antenna 101 and a pitch for each turn satisfies the formula (3) as in the case (B). It is also desirable that the length of the long side of the other conductor line adjacent to the conductor line at the innermost periphery (the conductor line located at the first turn from the innermost periphery) is shorter than λ/2.

(C) Feeding point from the rectangular spiral antenna to IC

It is desirable to provide the feeding point from the rectangular spiral antenna to IC at the end of the conductor line at the outermost periphery, and further desirable to provide there the end of the conductor line at the innermost periphery at the end. The feeding point may be provided at the midpoint in the longitudinal direction of the rectangular spiral antenna (for example, the outer dimension in the longitudinal direction of the antenna: $L_{xo}$ shown in FIG. 1), or may be slightly shifted from the midpoint to the longitudinal direction. A value dx of a shift 109 at a position where IC is mounted (feeding point) with respect to the center (midpoint) in the longitudinal direction of the rectangular spiral antenna has to be kept within range of for example "$\Sigma 8\ np|_{n=1\ to\ N}$." In the rectangular spiral antenna shown in FIG. 1, the value can be approximately specified as "$(N-1)\times 8p$" or less.

In other words, the feeding point lies at a position where the conductor line at the outermost periphery is terminated at one side thereof extending in its longitudinal direction (or in the vicinity), so that the position influences current waveforms produced in the longitudinal direction of the conductor line. However, setting the position of the feeding point at the midpoint in the longitudinal direction or within range of a predetermined distance away from that position suppresses the influence on the current waveforms to a negligible extent. "Within range of a predetermined distance" stated above means a range of which upper limit is the maximum value of "shift in positions between the conductor lines at the outermost and the innermost periphery."

With the above cases (A) and (B) in view, it is recommendable to satisfy the following conditions as a designing guideline to embody a signal processing circuit according to the present invention.

$$2\times(L_{xi}+L_{yi})<\lambda_2<2\times(L_{xo}+L_{yo}) \qquad (4)$$

It is desirable that the inner dimension in the longitudinal direction of the antenna $L_{xi}$ is shorter than λ/2 in terms of preventing current from reversing in phase in the longitudinal direction of the rectangular spiral antenna.

[Application]

Figure 4:
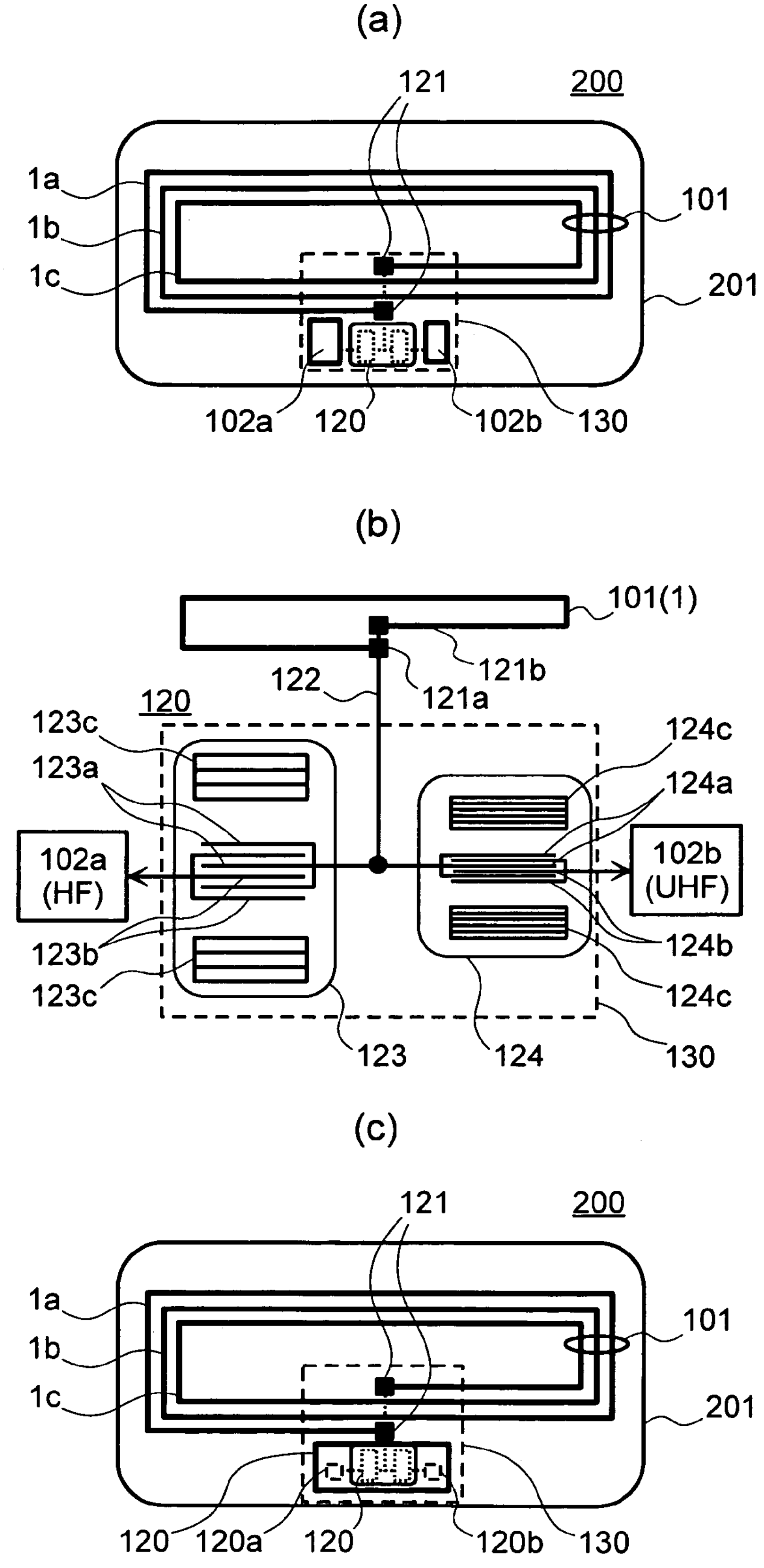
FIG. 4 is an explanatory drawing for the non-contact IC card according to an embodiment of the present invention to which the signal processing circuit with the antenna shown in FIG. 1 is applied.
Figure 5:
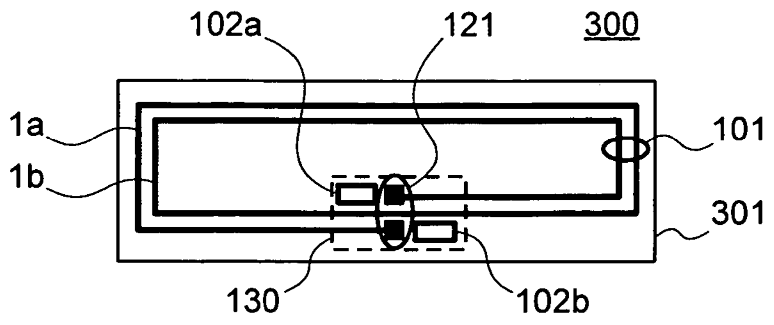
FIG. 5 is an explanatory drawing for the tag according to an embodiment of the present invention to which the signal processing circuit with the antenna shown in FIG. 1 is applied.
Figure 5:
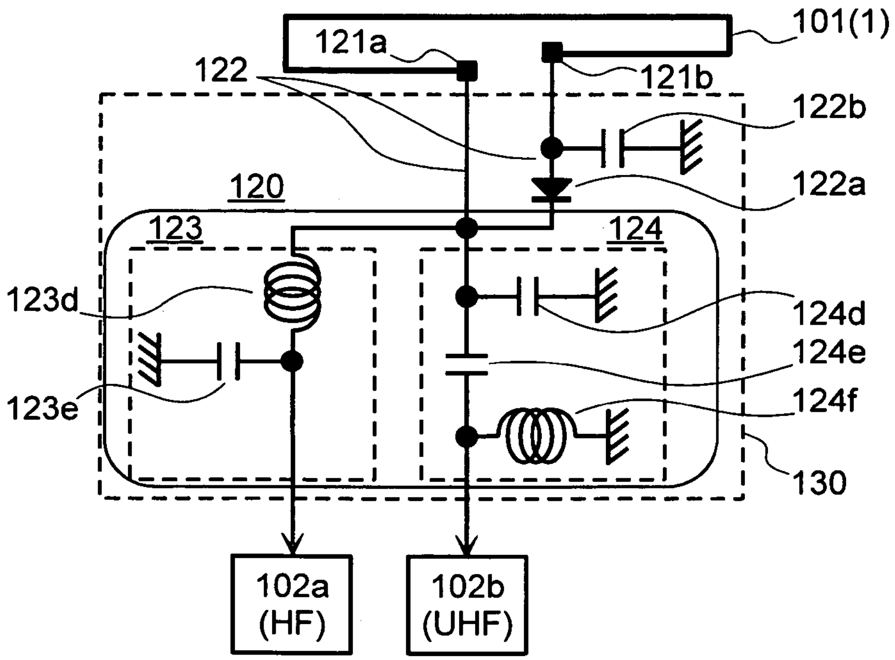
Figure 5:
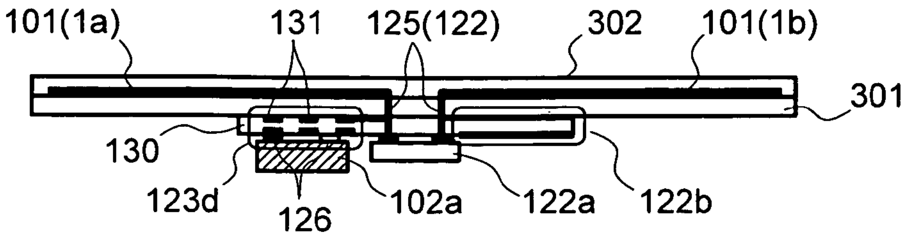

The following is a description of a non-contact IC card shown in FIG. 4 and a tag (IC tag) shown in FIG. 5 as applications of the signal processing circuit according to the present invention described above.

As described above, the signal processing circuit according to an embodiment of the present invention is equipped with IC including an RF circuit and the rectangular spiral antenna being a planar coil, particularly characterized in that communication is performed using at least two carrier frequencies by means of the rectangular spiral antenna. In either the non-contact IC card or tag, one of the two carrier frequencies is in the HF band (in general, a frequency band of 3 MHz to 30 MHz, 13.56 MHz is prevailing) and the other in the UHF band (in general, a frequency band of 300 MHz to 3000 MHz, including 5.8 GHz exceptionally). The latter is 100 times higher than the former in carrier frequency.

The rectangular spiral antenna 101 as a loop antenna supplies electric power from the external device to an integrated circuit (IC) 102 provided in the signal processing circuit by the carrier of the HF band (hereinafter referred to as "carrier of a first frequency") to import information and sends information from IC 102 to the external device. Further, the rectangular spiral antenna 101 as a dipole antenna supplies electric power from the external device to an integrated circuit (IC) 102 provided in the signal processing circuit by the carrier of the UHF band (hereinafter referred to as "carrier of a second frequency") to import information and send information from IC 102 to the external device. If the first frequency is set at 13.56 MHz which has been widely used in RFID known as a non-contact IC card and a tag, the wavelength corresponding thereto is about 22 m. On the other hand, if the second frequency is set at a frequency band of 860 MHz to 960 MHz, the wavelength ranges from 30 cm to 35 cm. If it is set at 2.45 GHz, the wavelength is about 12 cm. When five conductor lines, each being 33 cm in length on an average, are connected in series to each other to form the rectangular spiral antenna 101 in line with the aforementioned consideration about the configuration of the rectangular spiral antenna, and a signal processing circuit for receiving carriers of the first frequency of 13.56 MHz and the second frequency of 860 MHz being higher than the first frequency is produced, the line length L of the rectangular spiral antenna 101 is 165 cm, which is shorter than that of the first frequency. If the long side of the conductor line positioned at the outermost periphery of the rectangular spiral antenna 101 is 12.5 cm and the short side is 4.5 cm, the current corresponding to the wavelength (about 35 cm) of the second frequency shorter than that of the first frequency is less liable to reverse in phase at the long side. In the signal processing circuit for receiving the carrier of the first frequency of 13.56 MHz and the carrier of the second frequency of 2.45 GHz, the rectangular spiral antenna 101 can be further downsized and be contained in a credit card.

FIG. 4 shows a schematic diagram of a credit card formed as non-contact IC card 200 provided with a signal processing circuit for receiving the carrier of the first frequency of 13.56 MHz and the carrier of the second frequency of 2.45 GHz. In FIG. 4(*a*), when the lower side of the rectangular spiral antenna 101 is written as a first side, the left side as a second side (it intersects with the first side and is shorter than that), the upper side as a third side (it opposes the first side, intersects with the second side and is longer than that) and the right side as a fourth side (it opposes the second side, intersects with the first and the third side and is shorter than the first and the third side), the rectangular spiral antenna 101 is formed by connecting in series three conductor lines 1*a* to 1*c* of which both ends (a first and a second end) are positioned the first side and the other end (the second end) of both the ends is positioned at a inner side than the one thereof (the first end). Each of the conductor lines 1*a* to 1*c* extends from the first end thereof through the second, third and fourth sides of the above rectangular spiral antenna 101 in that order, returns to the first side and terminates at the second end thereof. The first end of the conductor line 1*a* at the outermost periphery is one of the feeding points 121 connected to ICs (102*a* and 102*b*). The second end thereof is connected to the first end of the conductor line 1*b* adjacent to the conductor line 1*a*. The second end of the conductor line 1*b* positioned at the first turn from the outer periphery is connected to the first end of the conductor line 1*c* adjacent to the conductor line 1*b*. The second end of the conductor line 1*c* at the innermost periphery is the other one of the above feeding points 121. These conductor lines 1*a* to 1*c* are collectively printed on a resin substrate that is a base material 201 for the non-contact IC card. A resin film on which the conductor lines 1*a* to 1*c* are printed may be stuck on the principal plane of the base material 201.

In the non-contact IC card shown in FIG. 4(*a*), integrated circuit elements mounted thereon are divided into a first integrated circuit 102*a* responding to the first frequency and a second integrated circuit 102*b* responding to the second frequency, instead of applying a hybrid type responding each of the carriers of the first and the second frequency as shown in FIG. 1. Furthermore, a branch circuit 120 is provided between the feeding point 121 and the first and second integrated circuits 102*a* and 102*b* to prevent the second integrated circuit 102*b* from malfunctioning due to the carrier of the first frequency and the first integrated circuit 102*a* from malfunctioning due to the carrier of the second frequency.

FIG. 4(*b*) is a schematic diagram showing one example of the branch circuit 120. The branch circuit 120 is formed as a resonator using two surface acoustic wave (SAW) devices in which comb-shaped electrodes 123*a* to 123*c* and 124*a* to 124*c* are formed on the principal plane of the base material 130 composed of piezo material such as lithium niobate ($LiNbO_3$). The input electrodes 123*a* and 124*a* of the branch circuit are connected to a feeder 122 extending from a feeding point 121*a* connected to the conductor line 1*a* and from a feeding point 121*b* connected to the conductor line 1*c*. The SAW resonator provided with the comb-shaped electrodes 123*a* to 123*c* functions as a band pass filter (low pass filter) 123 which passes a signal of the first frequency to the output electrode 123*b* but does not pass that of the second frequency. The SAW resonator provided with the comb-shaped electrodes 124*a* to 124*c* functions as a band pass filter (high pass filter) 124 which passes a signal of the second frequency to the output electrode 124*b* but does not pass that of the first frequency. For this reason, the space between the comb-shaped electrodes 124*a* to 124*c* provided on the band pass filter 124 is narrower than that between the comb-shaped electrodes 123*a* to 123*c* provided on the band pass filter 123 according to the wavelength of the signal to be passed. The output electrode 123*b* of the band pass filter 123 is connected to the first integrated circuit 102*a* and the output electrode 124*b* of the band pass filter 124 is connected to the first integrated circuit 102*b*.

In FIG. 4(*b*), the rectangular spiral antenna 101 composed of the conductor lines 1*a* to 1*c* shown in FIG. 4(*a*) is abridged to a single conductor line 1 for convenience of drawing. The base material 130 on which the branch circuit 120 is formed is embedded within a recess formed in a resin substrate that is the base material 201 for the non-contact IC card. Two feeding points 121*a* and 121*b* illustrated by black squares are connected to the feeder 122 formed on the base material 130.

FIG. 4(*c*) shows a schematic diagram of the non-contact IC card using the integrated circuit 102 into which the first and the second integrated circuit 102*a* and 102*b* shown in FIG. 4(*a*) are integrated. The branch circuit 120 is provided between the feeding point 121 and the integrated circuit 102. On the lower surface (mounting surface) of the integrated circuit 102, electrodes 120*a* and 120*b* for receiving signals of the first and the second frequency respectively are provided and mounted facedown on the base material 130 to connect the electrodes 120*a* and 120*b* to the output electrode 123*b* of the band pass filter 123 and the output electrode 124*b* of the band pass filter 124 respectively.

FIG. 5(*a*) shows a schematic diagram of a tag (IC tag) with a signal processing circuit for receiving the carrier of the first frequency of 13.56 MHz and the carrier of the second frequency of 900 MHz. The tag is formed on a flexible base material 301 composed of epoxy resin or polyethylene terephthalate (PET) so that it can be pasted on delivery such as a parcel. The rectangular spiral antenna 101 is printed for example on the principal plane of the base material 301. The rectangular spiral antenna 101, of which two conductor lines 1*a* and 1*b* are connected in series to each other, is so formed to meet the following; the outer dimension in the longitudinal direction of the antenna (length $L_{xo}$ shown in FIG. 1) of 16.6 cm or less (less than ½ of the carrier wavelength), the inner dimension in the longitudinal direction of the antenna (length $L_{xi}$ shown in FIG. 1) of 8.4 cm or more (over ¼ of the carrier wavelength), and the outer dimension in the widthwise direction of the antenna (length $L_{yo}$ shown in FIG. 1) of 8.3 cm or less (less than ¼ of the carrier wavelength), in terms of a carrier wavelength of 33 cm of the second frequency received and transmitted by the two the conductor lines. Since the rectangular spiral antenna 101 is shorter in total length than the value of $N\times\{(2\times\lambda_2/2)+(2\times\lambda_2/4)\}=3N\lambda_2/2$ (where, a reference character N denotes the number of the conductor lines) relative to the carrier wavelength $\lambda_2$ of the second frequency, the antenna wiring width 108 (refer to FIG. 1, the width w of the conductor line) is narrowed like a microstrip line. This however does not hinder transmission and reception of the carrier of the first frequency with a wavelength of 22.1 m unless the number of the conductor lines N is 44 or more.

Also on the tag shown in FIG. 5(*a*) are mounted the first and second integrated circuit 102*a* and 102*b* responding to the first and the second frequency respectively as is the case with the non-contact IC card shown in FIG. 4(*a*). A branch circuit formed on the base material 130 is provided between the integrated circuits 102*a* and 102*b* and the feeding point 121 provided on both the ends of the rectangular spiral antenna 101.

FIG. 5(*b*) shows one example of the branch circuit 120 provided on the tag illustrated in FIG. 5(*a*). FIG. 5(*c*) shows a cross section of the tag and a part of the branch circuit 120. In FIG. 5(*b*), the rectangular spiral antenna 101 composed of the conductor lines 1*a* to 1*b* shown in FIG. 5(*a*) is drawn as a single conductor line 1. The symbol for ground potential shown in FIG. 5(*b*) signifies "reference potential" in the tag circuit, the elements connected to the symbol in the figure do not need grounding. In contrast to the feeder 122 extending from the feeding point 121*a* provided on one end of the outermost periphery of the rectangular spiral antenna 101 to the branch circuit 120, the feeder 122 extending the feeding point 121*b* provided on the other end of the innermost periphery is provided with a Schottky barrier diode 122*a* and a capacitor 122*b*. The Schottky barrier diode 122*a* functions to demodulate signals to be received by the tag and to modulate signals to be transmitted therefrom.

The branch circuit 120 shown in FIG. 5(*b*) is provided with a band pass filter 123 connected to the first integrated circuit 102*a* responding to the first frequency and a band pass filter 124 connected to the second integrated circuit 102*b* responding to the second frequency. The band pass filter 123 is equipped with a resonance circuit with an inductance 123*d* and a capacitance 123*e*, and functions as a low pass filter which passes a signal of the first frequency and blocks a signal of the second frequency. The band pass filter 124 is equipped with a resonance circuit with capacitances 124*d* and 124*e* and an inductance 124*f*, and functions as a high pass filter which passes a signal of the second frequency and blocks a signal of the first frequency.

A conductive layer composing the inductances 123*d* and 124*f* and capacitances 123*e*, 124*d* and 124*e* in the branch circuit 120 is formed on the base material 130 like the inductance 123*d* shown in FIG. 5(*c*). The base material 130 can be formed by film such as epoxy resin or polyethylene terephthalate (PET) to make the tag more flexible as is the case with the base material 301 for the tag, or may be formed by film made of more flexible material. The inductance 123*d* shown in FIG. 5(*c*) is formed into the shape of a coil by electrically connecting conductive layers 131 (darkened in the figure) printed on both the principal planes of the base material 130 to each other via through holes formed in the base material 130. One of the conductive layers 131 is electrically connected to an electrode (pad) 126 formed on the first integrated circuit 102*a* to form a signal path between the band pass filter 123 and the first integrated circuit 102*a*. One of electrodes 126 on the first integrated circuit 102*a* shown in a blank square (in FIG. 5(*c*)) shows a dummy pad which does not contribute to transmission and reception of signals between the integrated circuit and the branch circuit 120.

On the base material 130 a conductive layer composing the capacitance 122*b* provided on the feeder 122 is also formed, and on one of the principal planes of the base material 130 (side opposite to the surface joined to the base material 301) is mounted the Schottky barrier diode 122*a*. The feeders 122 extending from the feeding points 121*a* and 121*b* are formed as through holes passing through the base materials 301 and 130. The principal plane of the base material 301 on which the rectangular spiral antenna 101 is formed is covered with a protective film 302, on the top face of which an adhesive (not shown) is coated for pasting the tag on a parcel and the like.

Any of the signal processing circuit, the non-contact IC card and tag (RFID) with the use thereof according to an embodiment of the present invention described above is capable of transmitting and receiving a plurality of carriers different in frequency band from each other by a single antenna equipped therewith, which facilitates downsizing and reducing a production cost. Elimination of need for providing a plurality of antennas in one circuit (device) dismisses fears for interference between antennas. For this reason, an RFID system being constructed by using both the HF band of which the upper output limit is regulated and the UHF band of which output may be increased can be realized by an RFID equipped with a single antenna. That is to say, the system can be practically applied without the system user's having a plurality of RFIDs (the non-contact IC card and/or tag) and without producing a new RFID including a plurality of the antennas.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A signal processing circuit comprising an IC including an RF circuit and a rectangular spiral antenna being a planar coil and communicating by using at least two carrier frequencies;

wherein when the two carrier frequencies are taken as $f_1$ and $f_2$ (where, $f_1<f_2$) and wavelengths corresponding to the carrier frequencies $f_1$ and $f_2$ are taken as $\lambda_1$ and $\lambda_2$ (where $\lambda_1>\lambda_2$) respectively, the line length L of the rectangular spiral antenna satisfies a relationship of $L<<\lambda_1$, and the outer and the inner dimension $L_{xo}$ and $L_{xi}$ in the longitudinal direction of the antenna and the outer and the inner dimension $L_{yo}$ and $L_{yi}$ in the widthwise direction thereof satisfy a relationship of $2\times(L_{xi}+L_{yi})<\lambda_2<2\times(L_{xo}+L_{yo})$.

2. The signal processing circuit according to claim 1, wherein the IC is connected to a feeding point provided at the long side of the rectangular spiral antenna and the feeding point is located in the center of the long side or in the vicinity thereof.

3. The signal processing circuit according to claim 2, wherein the rectangular spiral antenna is formed by sequentially connecting N conductor lines having opposing first and second long sides and opposing first and second short sides and running from the first long side to the first long side through the first short side, the second long side and the second short side, and the N conductor lines are so arranged that one of the conductor lines at the outer periphery of the rectangular spiral antenna is spaced by pitch "p" away from the other conductor line being adjacent to the one conductor line and being connected to the one conductor line at the first long side, and the N conductor lines do not intersect with each other.

4. The signal processing circuit according to claim 3, wherein the IC is connected to the feeding point provided on one of the N conductor lines arranged at the outermost periphery of the rectangular spiral antenna at the first long side of the rectangular spiral antenna, and the feeding point is formed at the midpoint of the one conductor line at the first long side or at a position being $\Sigma 8np\mid_{n=1\ to\ N}$ away from the midpoint along the first long side.

5. A non-contact IC card including a base material on which the signal processing circuit according to claim 1 is mounted.

6. A tag including the signal processing circuit according to claim 1.

7. A signal processing circuit comprising:

a first circuit element responding to a first signal transmitted by the carrier of a first frequency;

a second circuit element responding to a second signal transmitted by the carrier of a second frequency being higher than the first frequency; and a rectangular spiral antenna formed on a plane composed of a first and a second side opposing each other and a third and a fourth side opposing each other and being shorter than any of the first and the second side; wherein the rectangular spiral antenna is formed by connecting the other end of one of an adjacent pair of N conductor lines running from one end of the first side on the plane to the other end of the first side via the third, the second and the fourth side in that order and not intersecting with each other to one end of the other of the adjacent pair of N conductor lines, and the first and the second circuit elements are connected to the one end of one of the N conductor lines provided at the outermost periphery on the plane.

8. The signal processing circuit according to claim 7, wherein when the wavelengths of carriers of the first and the second frequency are taken as $\lambda_1$ and $\lambda_2$ respectively (where $\lambda_1>\lambda_2$), the rectangular spiral antenna formed by connecting the N conductor lines in series is shorter than the wavelength $\lambda_1$ in length, and the wavelength $\lambda_2$ is shorter than the length from the one end of one of the N conductor lines provided at the outermost periphery on the plane to the other end thereof and longer than the length from the one end of the other one of the N conductor lines provided at the innermost periphery on the plane to the other end thereof.

9. The signal processing circuit according to claim 8, wherein when the length of one of the N conductor lines provided at the outermost periphery on the plane at the second side is taken as $L_{xo}$ and the length of the other one of the N conductor lines provided at the innermost periphery on the plane at the second side is taken as $L_{xi}$, the length $L_{xo}$ is greater than $\lambda_2/4$ relative to the wavelength $\lambda_2$, and the length $L_{xi}$ is smaller than $\lambda_2/2$.

10. The signal processing circuit according to claim 8, wherein when the length of one of the N conductor lines provided at the outermost periphery on the plane at the third or the fourth side is taken as $L_{yo}$, the length $L_{yo}$ is smaller than $\lambda_2/4$ relative to the wavelength $\lambda_2$.

11. The signal processing circuit according to claim 7, wherein the one end of the one of the N conductor lines provided at the outermost periphery on the plane is connected to the first circuit element via a first filter element for passing the carrier of the first frequency and blocking the carrier of the second frequency, and the one end of the one of the N conductor lines is connected to the second circuit element via a second filter element for passing the carrier of the second frequency and blocking the carrier of the first frequency.

12. The signal processing circuit according to claim 7, wherein the one end of the one of the N conductor lines provided at the outermost periphery on the plane is connected to the first circuit element via a first filter element for passing the carrier of the first frequency and blocking the carrier of the second frequency, and the one end of the one of the N conductor lines is connected to the second circuit element via a second filter element for passing the carrier of the second frequency and blocking the carrier of the first frequency.

13. The signal processing circuit according to claim 7, wherein the first frequency is in the HF band and the second frequency is in the UHF band.

14. The signal processing circuit according to claim 13, wherein the second frequency is 100 times higher than the first frequency.

* * * * *